United States Patent [19]

Hanselka et al.

[11] Patent Number: 4,790,005
[45] Date of Patent: Dec. 6, 1988

[54] CIRCUIT ARRANGEMENT FOR TELECOMMUNICATIONS SWITCHING SYSTEMS, PARTICULARLY TELEPHONE SWITCHING SYSTEMS WITH INFORMATION PROCESSING SWITCHING DEVICE AND PROCESSING LOAD LIMITING

[75] Inventors: Peter Hanselka, Mering; Joerg Oehlerich, Gauting, both of Fed. Rep. of Germany

[73] Assignee: Siemens Aktiengesellschaft, Berlin and Munich, Fed. Rep. of Germany

[21] Appl. No.: 114,898

[22] Filed: Oct. 29, 1987

[30] Foreign Application Priority Data

Oct. 30, 1986 [DE] Fed. Rep. of Germany ....... 3636992

[51] Int. Cl.⁴ ............................................ H04M 3/36
[52] U.S. Cl. .................................. 379/244; 379/113; 379/137
[58] Field of Search .................. 379/9, 165, 268, 111, 379/112, 113, 137, 244, 243, 242

[56] References Cited

U.S. PATENT DOCUMENTS

| | | | |
|---|---|---|---|
| 3,940,568 | 2/1976 | Rutowski et al. | 179/18 ES |
| 4,564,725 | 1/1986 | Daisenberger | 179/8 A |
| 4,658,098 | 4/1987 | Wegmann | 379/113 |
| 4,731,817 | 3/1988 | Jonsson et al. | 379/112 |

FOREIGN PATENT DOCUMENTS

| | | |
|---|---|---|
| 0176764 | 9/1986 | European Pat. Off. |
| 1537849 | 10/1971 | Fed. Rep. of Germany |
| 2826113 | 12/1979 | Fed. Rep. of Germany |
| 3100811 | 8/1982 | Fed. Rep. of Germany |
| 3104002 | 8/1982 | Fed. Rep. of Germany |
| 3106903 | 10/1983 | Fed. Rep. of Germany |
| 3128365 | 6/1984 | Fed. Rep. of Germany |
| 3328571 | 2/1985 | Fed. Rep. of Germany |

OTHER PUBLICATIONS

"Republic of South Africa specification" entitled Apparatus for use in a telecommunications System.
IEEE Transactions on Communications, Sep. 1973, "Real-Time Testing of Automatic Overload Control Systems in a Laboratory Environment", F. T. Man, pp. 1027–1031.
No. 78 CH1325-OASST, "Design Philosophies on Local Digital Switching Systems", Horiki et al., pp. B2.1–B2.5 and pp. A4.1–A4.4.
telcom report, vol. 4 (1981), "EWSD Digital Switching System".

Primary Examiner—Stafford D. Schreyer
Attorney, Agent, or Firm—Adel A. Ahmed

[57] ABSTRACT

Information(s) to be processed for call set up, as well as for testing and maintenance are supplied to a switching unit. The former are prioritized. A loadability measuring circuit, which compares actual-loading with reference-loading during leveling longer period, short term fluctuations, and continuously sets an adjustment standard related to the inflow of information, which is pre-supplied to a corresponding counter, for continuing inflow measurement, then measures loading caused by information of both kinds, measures instead, average corresponding reduced reference-value dependent, reference-actual comparison, for the case where this loading is too high, only the loading dependent upon call set up information to be processed. The adjustment standard is only reduced when the latter loading is too high, it is increased instead when the latter loading, as well as the loading dependent upon both kinds of information is too low.

2 Claims, 1 Drawing Sheet

CIRCUIT ARRANGEMENT FOR TELECOMMUNICATIONS SWITCHING SYSTEMS, PARTICULARLY TELEPHONE SWITCHING SYSTEMS WITH INFORMATION PROCESSING SWITCHING DEVICE AND PROCESSING LOAD LIMITING

The invention relates to a circuit arrangement for telecommunication switching systems, particularly telephone switching systems with at least one information processing switching device which is to maintain and process, a series of technical switching information processing requests for selected individual call-ups as well as technical operating data processing requests for functional test procedures and/or for establishing and storing a data base serving the switching operation of a switching system, and with a measuring device, serving to measure the processing loadability of the switching device, which regulates a loadability through a reference-to-actual comparison related to the respective sum of the actual occupied times per measuring period and a reference-occupied-total time resulting from the length of the measuring period and an established switching device reference traffic flow value, for example 95%, which indicates the momentary loadability of the switching device in terms of the number of information(s) to be processed by the switching device per measuring period and is accepted by a counter which accesses the inflow of the information to be processed to the switching system by counting the same through forward stepping, and in order to evaluate this inflow continuously in single steps is either caused to backward step through a clock pulse determined by the loadability value, or is respectively reset to zero by means of time intervals determined by the loadability value, and whose maximum attained count is an evaluation of this inflow, which upon reaching or exceeding a limit value, causes non-acceptance devices to non-accept a part of the information waiting to be processed.

Circuit arrangements of this type are already known from German published application Nos. 33 28 571 and 34 35 720. For switching devices known in the art, a central processor in a telecommunication switching system, for example, there are two basic requirements, among others. It should be loaded as well as possible, i.e. it should execute as many as possible of the arising information processing requests, hopefully all. However, it must also be protected against an overload, so that the information processing sequencing therein, which the processor has already begun can occur in proper time, and can be executed without disturbance (for example, an overfilling of what is referred to as an input list must also be prevented); for this purpose the load supplied to the central processor may have to be limited, so that a number of information processing requests are non-accepted. These two requirements are contradictory.

The load of the central processor, i.e. its practical exploitation, should be as high as possible; however, overloads should thereby be avoided with optimally high reliability. The measuring device referred to in the preamble, which accesses the relatively long term fluctuations of loadability, for example, the respective typical loadability for different times of day, serves to meet these requirements in the manner indicated in the preamble. The loadability measurement which accesses the relatively long term loadability behavior through this measuring device is described in greater detail below.

Meeting the above noted requirements is complicated by the unsystematic, constant fluctuations in the load of the central processor, which fluctuations occur over and over again at random. In addition to a clear and steady, rising or falling tendency, which would still be relatively easy to govern in terms of control engineering, the load behavior can exhibit a discontinuously rising tendency, a tendency which rises discontinuously for a relatively short time (loading peaks), a gradually rising tendency and the like.

In order to govern this multitude of load behavior modes, the initially set forth circuit arrangement provides, among other things, a counter which only acquires the initial switch identifiers in time segments from the information processing requests incoming to the central processor described. As is known, an initial switch identifier is always a first of a series of switch identifiers whereby a series encompasses a sequence of interrelates switch identifiers; these can, for example, be respectively all switch identifiers which belong to a respective call set-up, i.e. occupation identifiers (also referred to as call signals), dial information (numerals of a multi-digit call number), end of dialing identifiers, answer identifiers, fee charge information, end identifiers and the like. All of these switching symbols can be transmitted to the respective central processor and represent information processing requests for the latter. Since, per call, they arrive successively and with, in part greater chronological intervals from one another, they arrive at the central processor unsystematically time interleaved. An initial switch identifier, is thus always the first of a series of associated switch identifiers. Thereby the switching symbols that are formed together, in relation to a call set-up can form such a series of information processing requests. A series of information processing requests may however also be restricted to all dial numerals provided for a call set-up.

Since each initial switch identifier always represents the beginning of a series of respective information processing instructions, which will not arrive successively until the next few seconds (as a first, thus an inital switch identifier), together with a number of succeeding switch identifiers, the initial switch identifiers are acquired, by the described counters, in the known switching systems, because the behavior of the incidence of inital switch identifiers always concurrently previews the behavior of only the information processing load to the central processor in the coming seconds. This can be influenced with the respective non-acceptance measures that have been described in the referenced published applications already referenced. For this purpose non-acceptance devices are provided which reject a part of the arriving information processing requests, in particular a part of the initial switch identifiers to be processed, including the respective associated succeeding switch identifiers in accordance with the respective transmitted non-acceptance percentage developed with the aid of the counter.

For comparing the tendency of the load development in the central processor, which is already foreseeable to a certain degree in the manner set forth, to the momentary actual load of the central processor, the circuit arrangement described in the referenced published application includes a load measuring device with which a deviation of the momentary load from a reference value (for example 95%) coming close to the 100% value is measured. For this purpose all time periods during whioh the central switching circuit is required per measuring period are summed and the resulting sum is compared with the respective reference value. When such a deviation exists the load measuring device provides an increase signal for too low a load and a decrease signal for too high a load to the counter accessing the inflow of information processing requests, in particular, initial switch identifiers. A control standard value, i.e. a comparison value is stored in the counter which is respectively raised somewhat through the increase signal and lowered somewhat through the decrease signal. This comparison value therefore indicates the number of initial switch identifiers per unit time, for example per second, which result in a load in the switching device at the provided level of, for example 95%, under the respective momentary loadability conditions, i.e. under the time-of-day conditions, for example.

On the basis of the indicated increase, and/or decrease, of the comparison value, the running comparison of the respective number of information processing requests to a comparison value is always based on an updated comparison value. The fluctuations thereof which result from the fluctuations in the loadability of the processor are conditioned in that the composition of information processing actions of various types during the ongoing operation of the central processor can shift in the daily cycle and/or the weekly cycle and/or in the annual cycle as well. Under the assumption that the central processor is a telephone switching system it can therefore occur, for example, that it is predominantly local calls that are to be set up at certain times of the day, whereas it is predominantly long-distance calls at certain other times of the day. The same can also be observed with respect to various days of the week (working days or, respectively, Sundays and holidays). Furthermore it can also occur that more short duration calls take place at certain times of the day or on certain days and more long duration calls occur at other times of the day or, respectively, on other days. It can also occur that more special services are used at certain times of the day than at other times of the day. It can also occur that the number of prematurely aborted call set-up operations is higher at certain times of the day. The same is always true regarding different days (working days of Sundays and holidays). Differences can also occur when the network is operated at nominal load, high load or even an overload, the number of incomplete connections being particularly increased. Consequently, the loadability (number of processible sequences of information processing requests) of a central processor of the aforementioned kind known in the art, is not constant.

The processing requests forwarded to a switching device of the aforementioned type are not only technical switching information processing requests for individual selected connections but also technical operating data processing requests for function test procedures and/or for the establishment of a switching system related stored data base to serve the switching operation. Switching devices of the aforementioned kind thus maintain and must work on processing requests of both kinds.

In the circuit arrangements known through the two published disclosures, the non-acceptance of information processing requests occurs in non-accept devices in decentralized control facilities. This non-acceptance is, consequently, limited to technical switching information processing requests for selected individual connections in the aforementioned cases.

Since the control described operates to bring about a given necessary throttling (through non-acceptance) of a load value for the central switching device that is somewhat less than 100%, it may happen, in the aforementioned cases, that the said data processing requests (for functional test procedures and/or for the establishment of a switching system related stored data base, to serve the switching operation) gradually displace the technical operating data processing requests for selected individual connections. For it may happen, that during a greater accumulation of data processing requests, these will constantly increase the actual load of the switching device somewhat, in relation to the reference load of the switching device, as a result of which the continuously repeated reference-actual-comparison referred to in the preamble will lead to a constant reduction in the (loadability) value, with the aim of bringing the actual load of the switching device to the desired value of 95%, for example. This may result in the share held by the data processing requests slowly but steadily increasing and the technical information processing being gradually displaced.

An object of the invention is to disclose means, for a circuit arrangement of the type described in the preamble, through which the aforementioned displacing effect is removed. At the same time, assurance is to be provided that the share of the work capacity of the switching system serving the development of the technical information processing requests, cannot be displaced through the data processing requests, which are of course not subject to the non-acceptance means effected by the counter.

This object is achieved through the invention, in that the information processing requests as opposed to the data processing requests are accepted by the switching device on a priority basis according to which the data processing requests are accepted only when none, or fewer than a maximum, number of processing requests of both kinds, or only of information processing requests for the same, which is dependent on the reference-actual-comparison made up of the combination of the processing requests resulting from the sum of the actual-busy-times and the combination of the corresponding switching device-reference-busy-total duration, that then, when this-sum is smaller than the resulting reference-busy-total duration, the number of information(s) to be processed by the switching device is raised by the regulation, but that then when this sum is greater than the reference-busy-total duration, a modified reference-actual comparison is carried out, in which only the sum of the actual-busy-times resulting from the information processing requests and only the information processing requests related to the reference-traffic flow are taken as a base, and that the regulation of the loadability value follows in such manner, after the modification of the reference-actual-comparison, that then, when the said sum is smaller/higher than the resulting reference-busy-total duration, the loadability value is raised/lowered, respectively.

An embodiment of the invention, with only those components which are essential to its understanding is shown in the drawing. The description begins with the general functional sequences of a computer controlled telephone switching system, operating in accordance with the invention. The characteristic features of this switching system are then set forth further below.

A switching matrix network constructed in three switching matrix stages RZE, R and RZA comprises a large number of switching matrix network connections at the input side, one of these connections being illustrated and referenced A. The switching matrix network is composed of a plurality of switching network parts. Each of these switching network connections always comprises a pair of time division multiplex lines whereof the one time division multiplex line serves the purpose of signal transmission toward the switching matrix network and the time division multiplex line serves the purpose of signal transmission from the switching matrix network. Accordingly, the switching network connection A, comprises a time division multiplex line A1 and a time division multiplex line A2. The respective signal transmission direction for each of these two time division multiplex lines is indicated by appropriate arrows.

The switching matrices of the first switching matrix stage RZE are combined time-slot/space-slot multiplexers as the illustrated symbols show. The switching matrices of the center switching matrix stage R are space-slot matrices. The switching matrices of the last switching matrix stage RZA are again time-slot/space-slot matrices. A great number of the indicated matrices is provided in each switching matrix stage even though only three respective matrices of the respective type are shown per switching matrix stage. The switching matrices of the various switching matrix stages are connected to one another via links in the manner shown on the drawing. These links are time division multiplex links. The switching matrix network connections are also of the time division multiplex type.

The line trunk groups, for example the line trunk group LTG1, are individually connected to the switching matrix connections, for example the connection A, of the switching network part K being connected thereto via time division multiplex lines ltg1, which are respectively designed for both message transmission directions. At the input side, such a line trunk group can be connected to subscriber lines (analog and/or digital), analog trunks and pulse code modulation (PCM) trunks (alternately as well as in combination). A subscriber station connected via a subscriber line is referenced T1. Coders, decoders, multiplexers, de-multiplexers and the equipment required for realization of what is referred to as the BORSCHT function are contained in a trunk group (cf. NTZ, Vol. 33-1890, No. 10, pp. 646 through 652, and 1978 International Zurich Seminar on Digital Communications, proceedings IEE Catalogue No. 78 CH 1325-0 ASST, pp. B2-1, A4-1 as well as the German P 31 00 811.9/VPA 81 P 6201; P 31 04 002.0/VPA 81 P 6203 and P 31 06 903.7/VPA 81 P 6209.

The drawing also illustrates the line trunk group LTG1. The structure and operation thereof are described in detail in DE-OS 28 26 113 from the bottom of Page 6. The supplement to Vol. 4 (1981) of the periodical "telcom report" and U.S. Pat. No. 4,564,725 is also to be noted. Further explanations presume familiarity with the above description and are limited to those relationships which are especially significant in the present context.

A central control unit serves, among other things, for setting up the call connections which are to be established via the switching matrix network. It determines the switching data required for setting up each connection. As is shown, the switching data for a connection which is to be connected through, precisely specify the route of the appertaining connection via the switching matrix network i.e. the switching matrices and links to be traversed by the connection as well as the channels respectively occupied therein. These switching data are prepared with the aid of the central control unit which, therefore, also includes the function of a routing device in addition to an occupation memory, and are transmitted to the switching matrix marker KE. The data flow transmitting the switching data from the central control unit to the switching matrix network KE, is routed over a central data line D via a buffer MB which serves as an intermediate memory and for recoding of data as well as for matching the transmission rate. The buffer may be limited to a part of these functions or respectively only one of these functions. Such a buffer is described in detail, for example, in DE-PS 15 37 849 (VPA 67/3047).

In addition to the central switching unit CP, a greater plurality of decentralization control equipment GP1 through GPn is also shown, these being respectively individually assigned to the line trunk groups LTG1 through LTGn. These control devices serve for the execution of all switching events within each of the line trunk groups. Particularly included among the switching events, are all switching exchange events within these line trunk groups. Further details in this regard can be derived from DE-OS 28 26 113 already referred to.

The decentralization control equipment GP1 through GPn are in communication with the central control unit CP via data channels which are individually through-connected, per decentralized control unit, via the switching network K up to the buffer MB. A respectively separate data channel therefore leads to each of the decentralized control units from the buffer, namely from its data head ML. For this purpose, the buffer MB has its data head ML connected to one of the switching matrix network connections via a time division multiplex line m. The buffer is connected to one of the switching matrix network connections of the switching matrix network in the same manner as each of the line trunk groups LTG1 through LTGn. The time division multiplex line m is therefore connected to a switching matrix network connection which comprises a time division multiple input to space-slot/time-slot matrix of the first switching matrix stage and a time division multiplex output from the space-slot/time-slot matrix of the last switching matrix stage. The time division multiplex line m is therefore connected to a switching matrix network connection such as that referenced A.

Each data connection between the data head of a buffer and each of the line trunk groups, for example the line trunk group LTG1, comprises a channel for the transmission of data from the buffer to the appertaining line trunk group and a further channel for the transmission of data in the reverse direction. These two data channels lead to, and from, the decentralized control equipment individually assigned to the appertaining line trunk group.

The set up and maintenance of the data connection set forth, these being referred to as semi-permanent connections, via the switching matrix network occurs with the aid of the switching matrix network marker KE in the same way as the set up and maintenance of the message connections, for example telephone connections. For this purpose, holding memories are assigned in a known manner to the switching matrices of the switching matrix K, the data respectively appertaining to a switching matrix being stored in these holding memories. What is accomplished with the aid of these holding memories is that the required through-connections are made available in the respective time slots, or respectively, that the required write events and read events for the full memory of the time slot matrices occur. All further details which relate to the structure and operation of a time division multiplex matrix network are presumed to be well known in the art and therefore are not set forth in greater detail here.

As explained, the switching data required for the set up of message connections are transmitted from the central control unit to the switching matrix network marker KE via the buffer MB. The data head MK which is assigned to the buffer MB serves this purpose among others. For the sake of completeness it should be noted here that a plurality of switching matrix network markers KE can also be connected to a buffer MB. These plurality of switching matrix markers can be individually assigned to a plurality of switching network sections of a larger switching matrix network. It is also possible to provide a respective switching matrix network marker per switching matrix stage.

Since the data connection set forth above between the buffer MB, via the time division multiplex line m to each of the line trunk groups LTG1 through LTGn must be through-connected with the aid of the switching matrix network K before the set up message connections, for example telephone connections, can be initiated, a completely free switching matrix network is usually available for establishing these data connections, i.e. a switching matrix network in which all data channels are unoccupied. The set up of data connections can therefore occur in accordance with an arbitrarily defined pattern which remains unaltered for all times. Provision is therefore made for the switching matrix network marker KE, to also contain marker data, i.e. the switching data, for the data channels stored in a memory V1 assigned to the switching matrix network marker KE. In a re-establishment of the data connections, therefore, these switching data need not be respectively newly worked up by the central control unit CP and need not be transmitted again via the buffer MB. When the data connections required between the buffer MB and the line trunk groups LTG1 through LTGn, i.e. their decentralized control equipment GP1 through GPn, are to be re-established via the switching matrix network K, then the central control unit CP merely outputs a corresponding instruction to the buffer MB, which the latter relays to the switching matrix network marker KE, and on the basis of the marker KE takes the switching data stored in its memory V1 in order to execute the required switching events in the individual succession in a known manner.

As already explained in the aforementioned DE-OS 28 26 113, the indicated data connections between the control unit, for example GP, assigned to the line trunk groups, for example LTG1, on the one hand, and the central control unit CP, on the other hand, are also produced via the time channel coupler TSU of the line trunk group LTG1 in addition to message connections from and to subscriber stations, as well as trunk circuits. As already set forth, these data connections further proceed via the switching matrix network K and the time-division multiplex line m.

As has been set forth, the group control units GP1 through GPn are decentralized or sub-central control devices in comparison to the central control device CP. In combination, these sub-central controllers and the central controller are also referred to as switching units and as switching systems. The group control units and the central controller have a limited load capacity relative to the information capacity. A particular problem is presented by the load capacity of the central control unit.

As has also been set forth above, a plurality of line trunk groups LTG1-LTGn is provided in addition to the central switching matrix network K. Each of these line trunk groups is connected via a respective PCM line, for example, the line ltg1, to a switching matrix network connection, for example A, of the switching matrix network K, being connected thereto in the manner already set forth. Within the line trunk group, the PCM line per line trunk group leads to a line switching unit TSU, whose operation and significance is described in greater detail in the aforementioned German application 28 26 113. This through-connection arrangement involves a switching matrix sub-network by means of which both the data connections and the connections, to and from subscribers and to and from the trunk circuits, are through-connected. By "trunk circuit", of course, are also meant channels of connected PCM trunk circuits. The connection of these subscriber lines, trunk circuits and channels may be derived from the references set forth above.

Various information, for example call signals from subscriber stations which wish to set up a call, further, dialing identifiers from these subscriber stations, but also via trunk circuits and channels, further, line characters via trunk circuits as well as in allocation to channels, arrive via subscriber lines, trunk circuits and channels which are connected to a line trunk group at the input side. Subscriber line circuits for the connection of subscriber lines, terminator circuits for the connection of local and long distance trunks that are available, incoming and/or outgoing local call switching circuits, dialing receive instructions and the like are subscriber associated and/or connection associated switching devices. In a known manner, then, the group control unit serves the purpose of handling the acceptance of the aforementioned, incoming connection associated information. A group control unit also undertakes a processing or a pre-processing of these accepted information in respective assignment to the appertaining subscriber line, trunk circuit or to the appertaining channel. Furthermore, a few such information are intermediately stored in memory SP, respectively individually assigned to the group control unit in particular, with the aid of an input/output device IOP. Furthermore, the group control unit has the task of transmitting signals and control signals via these lines (subscriber lines and trunk circuits as well as channels), for example as ringing impulses and call progress tone signals via subscriber lines as well as selection identifiers and line identifiers and the like via trunk circuits occupied in the outgoing direction.

Connections with respect to the call set up direction, both incoming from a line (subscriber line, trunk circuit or a corresponding channel) in the direction toward the central switching matrix network K, as well as departing therefrom to such a line are through-connected. In a call set up, a through connection from, for example a subscriber line, first occurs via the appertaining line trunk group to the switching matrix network K. The data required for the further through-connection of the appertaining call via the switching matrix network are transmitted from the group control unit to the central control unit CP via the appertaining, aforementioned data connection. For the sake of completeness, it should also be mentioned here that there are likewise data that are transmitted from group control unit to group control unit not by way of the central control unit but over some other route (cf. DE-OS 31 28 365/VPA 81P 6257). The further call through-connection occurs via a line trunk group (possibly the same line trunk group, but usually different line trunk group), to which end the appertaining group control unit of the respective line trunk group must be activated or, respectively, the appertaining group control units of the respective line trunk groups must be activated.

For a group control unit, therefore, there are different types of through-connection procedures in view of the call set up direction, in particular, first, through connections from the subscriber line or trunk circuit (or a corresponding channel) in the direction of the switching matrix network K and, second, through connections in the opposite direction. The through-connections via a switching matrix sub-network are also divided into those from and those to the subscriber lines, on the one hand and on the other hand, those from and those to trunk circuits (or channels).

The information acceptance events and/or information transmission events, executed in conjunction with through-connection events per connection, require the respective group control at least once per connection. The respective type of through connection (incoming or outgoing from and to a subscriber line or trunk circuit) is the determining factor for the information processing traffic load per through connection-event which is necessarily connected with the respective recourse to the group control unit (as already stated, the group control units forward the information, which they accept in conjunction with a through-connection event either altered or pre-processed, to the central control unit, which they share). The central control unit likewise outputs information to the group control unit in order to execute outgoing through-connections which are required therein and in order to output signals and control signals via the appertaining lines (subscriber lines and trunk circuits or channels).

Every call on the part of a subscriber station and every incoming occupation of a trunk circuit (or of a corresponding channel) therefore requires a certain work load on the part of the appertaining group control unit. Each such work load can be recognized on the basis of an initial switch identifier for the respective group control unit. In the case of a subscriber line with loop pulsing, for example, the loop closure, which represents the call signal, is such an initial switch identifier. Such an initial switch identifier, in the case of a trunk circuit, for example, is the c-lead occupation signal with incoming occupation. A similar situation applies to independent connecting channels.

The initial switch identifiers referred to therefore differ from one another and are in particular dependent on the appertaining type of line (subscriber line or trunk circuit). In conjunction with the through-connection of a sub-section of a connection to be established, they respectively represent a corresponding measure of the information processing traffic load to be expected for the appertaining group control unit, particularly in conjunction with acceptance, processing and/or transmisson of information. For the different sub-sections of connections to be through-connected therefore, specific related measures are typical, these being the same for identical sub-sections but different from one another for different sub-sections. What applies to each of the group control units also applies in a corresponding manner to the central control unit CP. The differing extent of the information processing traffic load differs per through-connection depending on whether the through-connection to be executed via the switching matrix network K is an internal call, an incoming or outgoing local call or an incoming or outgoing long distance call, and in particular on the respective type of connection to be established.

The central control unit CP which has already been mentioned is a central information processing switching unit. The decentralized control devices GP1–GPn are sub-central, information processing switching units. As has already been set forth above, the data exchange between the sub-central switching units GP1–GPn, on the one hand, and the central switching unit CP on the other, takes place via the buffer MB. Information(s) that (is) are to be transmitted in the direction to the central switching circuit are forwarded via the lines za, ze and h. Information(s) that (is) are output from the central switching circuit CP to the sub-central switching circuits GP1–GPn are transmitted via the route c.

As has already been mentioned and as is generally known in the art, the central switching unit, of course, exhibits a limited load capacity with respect to its information processing capacity (no matter how high a capacity it may have). This load capacity relates to the number of information processing events that can be executed per unit time. The loadability of each central switching unit is fundamentally dependent on its construction (structure, program execution and instruction execution speed) and on the nature of the information processing events that are continuously transmitted thereto. As a rule, these differ in nature. They may occur mixed; the loadability therefore relates to the respectively given mix of information processing requests.

A loadability measurement differs from a load measurement in various ways, among them, by the fact that a determination is made, during under loading as well, of what number of arriving information processing requests, or initial switch identifiers, lead to what degree of switching circuit loading per unit time, and that, with a view toward a fully loaded switching circuit, a determination is made of what maximum number of information processing requests, or initial switch identifiers could be accepted per unit time.

Experience has shown that the composition of information processing events of various types, can shift during the operation of a central switching unit. For example it may occur, that mainly local connections are to be set up during certain times of the day, whereas long-distance connections dominate at other times of the day. Furthermore it may occur that more short duration calls occur at certain times of the day and more long duration calls occur at other timss of the day. It may also happen that more special servies are utilized at certain times of the day than at other times of the day. In this context, one also speaks of a changing traffic spectrum, which can exhibit different compositions in view of the different possible types of connections. In addition, the occupations prematurely aborted respectively, before the complete call set up, can be a greater proportion of the total call set up events at certain times of the day than at certain other times of the day. In this context, one can also speak of a changing occupation spectrum, with respect to the proportion and degree of the occupation attempts.

For the various reasons set forth above, the loadability with respect to the number of incoming seizure attempts of a central switching circuit is not constant. In order to optimally load a central switching circuit, it is therefore expedient to take into consideration the different loadabilities established at the variuos operating times due to the different pre-conditions. It is therefore advantageous to equip such control units with measuring devices for the determination of the loadability which integrate the constantly fluctuating load over time intervals that are respectively long enough to assure that the resulting determination will have adequate precision, whereby therefore, short duration fluctuations do not come to bear.

A measuring device B serving the above indicated purpose may work in a number of different ways. Generally what is done, is to establish for, and on the basis of, a respective given load, that is an actual load, how great the actual load must be (that is a reference load, i.e. a loadability corresponding to respective existing operating conditions), in order that a desired basic, ultimately practical traffic flow of for example 90%, 95%, 98% or 100% results therefrom. A traffic flow of 100% is theoretically conveivable. However since the load behavior exhibits an internal dynamic it is useful to consider a traffic flow somewhat under 100% in order that an entry list designated transit storage for information to be processed does not gradually fill with fluctuating load, but rather has an opportunity to clear itself from time to time.

Figure 1:
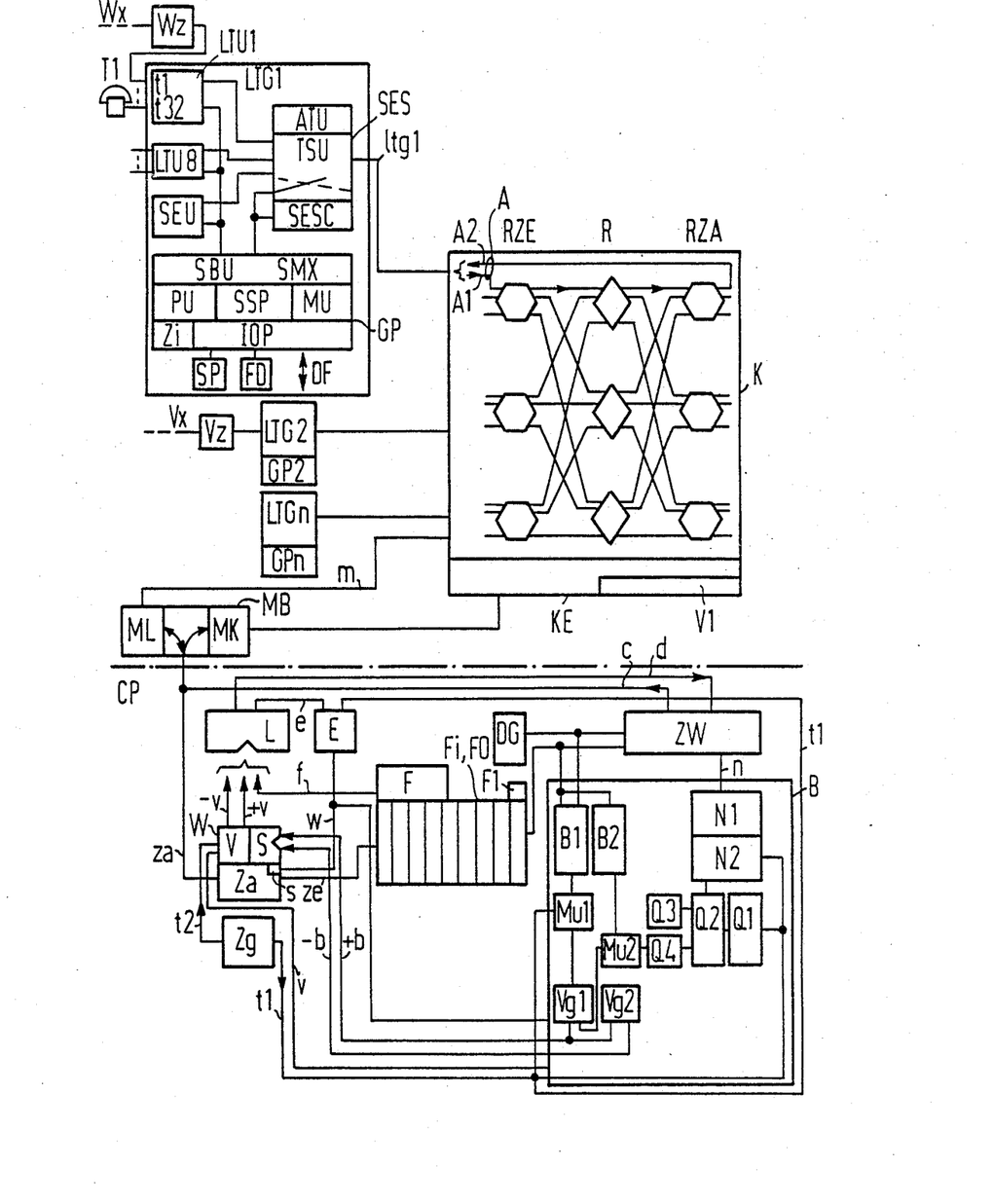

Basically, a loadability measuring device B, may operate on the basis that, during each four seconds, for example, it will access, measure and sum the measuring time intervals in which the appertaining central switching unit is actually in demand for processing events, that it forms a quotient by dividing the measured time interval by the desired traffic flow time value, and that it multiplies this information processing events counted during a respective measuring period by the quotient. The aforementioned accessing, measuring and sum formation may also be achieved through a further variation of the embodiment of the invention in accordance with FIG. 1 in which, for accessing the total time during which the central switching unit is in demand for processing events, the central processing circuit, after handling all assigned information processing requests, and until the arrival of a new information request, produces a request signal at constant time intervals which is transmitted to the measuring device B. This measuring device then counts the number of such requests signals that have arisen in the central switching circuit over defined time intervals of identical length, for example, over each four seconds.

The drawing illustrates a measuring device B assigned to the central switching circuit CP which is connected thereto via a line n. It therefore receives the request signal connected thereto via the line n every time such signal occurs. The measuring device B counts off the request signals in a known manner with the aid of a counter N. It receives a time marking signal via the line t1 from the central time generator Zg at an interval of four seconds. This time marking signal means the end of one measuring time interval and simultaneously means the beginning of the next measuring time interval. The measuring device B then identifies, through the counter N1, the number of incoming request signals of the respective central switching circuit between two such markings, that is in a respective measuring period. When no information processing requests are present for a long interval, these request signals are then emitted at time intervals which respectively correspond, on average, to an information processing event.

The measuring device B thus counts the request signals received within a measuring time interval and, from the number of appertaining request signals arriving within a measuring time interval, diverts that temporal part of the same, during the time in which the central switching device is not in demand for information processing requests. For this, it forms a complementary value with the aid of a complement value former N2, by subtraction of this temporal part from the measuring time interval at the end of the renewed arrival of the time marking signal over the line t1. In addition the measuring device measures the duration of a measuring time interval (separation of two time marking signals over the line t1) in a device Q1, and divides this value by the complementary value received from the compolement value former N2, in a device Q2. Thereby the indicated quotient is arrived at. It multiplies this (Q3/Q4), by the factor 0.95 (intended traffic flow value, for example) and passes the resulting product on. In addition, the measuring device counts the number of the number of processing requests actually carried out in the appertaining measuring time interval and multiplies this number by the aforementioned product. This then provides that number of processing requests by which the central switching circuit would actually be loaded under the existing operating conditions, with a traffic flow value of 95%, for example. The measuring device compares this number with a number determined and stored, from a previous measuring procedure.

Depending on the result obtained from the appertaining division operation per measuring time interval, the measuring device B either emits absolutely no signal to an occupation rate counter W, given too low, or respectively, to high a load of the central switching circuit (when, therefore, the reference rate loadability of 95% is higher, or respectively lower, than the load of the central switching unit actually present at the time) it emits an increase signal via a path +b, or respectively, a reduction signal via a path −b.

The central processor CP receives series of information processing requests, in a known manner, from a transit storage, FiFo. Should the transit storage FiFo be empty, an indicating device F1 provides a signal to data transmitting device DG. This data transmitting device contains technical operating data processing requests for functional test procedures as well as a data base memory for the structuring of a switching system serving the switching operation. Data processing requests for functional test procedures can, for example, be call set up data, for test connections, or encompass data which form test programs for the checking of regularly scheduled processing procedures, to be carried out by the central switching circuit. Such data processing requests can also encompass data that serve for the development of measuring programs. Furthermore, such data processing requests can also serve the purpose of providing an appertaining data base for storing, and respectively modifying as required, the structuring of a switching system and its wiring with lines. This data base which pertains to the structuring and wiring of a switching system with lines, is memorized and must be continuously up-dated with the latest information.

The central switching unit CP is thus primarily engaged by information processing requests that are essentially originated by subscriber dialing. In addition however, the central switching unit CP is also engaged by data processing requests, which are stored in, and transmitted by, the aforementioned data transmission device DG. It may be provided that the data transmission device transmits data processing requests only when the indicating device F1 indicates that the transit storage FiFo is completelY empty. It may also be provided however that the central switching circuit alternately handles information processing requests and data processing requests when the number of information processing requests in the transit storage, do not exceed a specified lower maximum. The indicating device F1 signals the data transmitting device DG the fact that there are no longer any information processing requests stored in the transit storage or the fact, that not more than a lower maximum number of information requests is stored in the transit storage. Thus in summary, it is to be determined that the information processing requests, as opposed to the data processing requests, are accepted with priority by the central switching circuit and accordingly, that the data processing requests are accepted only when less than a maximum number of information processing requests are ahead of the same.

As has already been explained, the central switching unit CP transmits request signals via the path n to a counter N1, which respectively counts the request signals which arrive during a measuring time interval, when it is engaged with neither information processing requests nor data processing requests. These request signals are then transmitted, when the central processing unit remains continuously un-engaged with processing requests, in chronological time intervals, that correspond respectively to about the duration of a processing request. The number of request signals accepted by the counter N1 per measuring time interval is thus a measure of the time respectively, within a measuring time interval in which the central switching unit was not engaged for processing requests.

As has also been explained, the complement value former N2 serves, in relation to the duration of each measuring time interval, to form a complement value which represents a measure of how long, during a measuring time interval, the central switching unit has been engaged in processing events. The complement value former N2, delivers the complement value it has derived at the end of a respective measuring time interval to a divider device Q2.

The time marking signals transmitted via the line t1 are received with the aid of a time measuring device Q1 and the duration of each measuring interval is measured with the aid of the time measuring device Q1. The respective derived measured value thus provides the respective duration of the appertaining measuring time interval. The duration of this indicated measure of the measuring time which was transmitted to the divider device Q2 by the time measuring device Q1 is now divided, at the end of each measuring time interval, by the complement value in the divider device Q2, which it has obtained from the complement value-former N2. The output of the division procedure carried out in the division device Q2 results in a quotient that indicates how much longer the duration of the appertaining measuring time interval is, compared to the total duration during which the central switching unit CP was actually engaged, in the respective measuring time interval, with processing events.

The measuring device B also contains two counters B1 and B2. All processing requests transmitted to the central switching circuit CP during a measuring time interval, i.e. information processing requests via the output of the FiFo memory, as well as data processing requests via the output of the data transmitter DG, are measured with the aid of B1. On the other hand, only all information processing requests transmitted to the central switching circuit are counted by the counter B2.

A traffic flow value of 95%, for example, is stored in the multiplier Q3 through which it is established that the central switching circuit is to spend 95% of its combined available time for processing requests, on handling such processing requests, and indeed on processing requests of both kinds, i.e. information processing requests and data processing requests. In an additional multiplier Q4, there is stored another traffic flow value that is somewhat lower, 85% for example, through which it is established that the cenral switching circuit is to spend up to 85% of its combined time, for information processing requests and data processing requests, on handling information processing requests. The quotient formed by the dividing device Q2 is transmitted to both multipliers and in both multipliers a product is formed from these quotients and the respective stored traffic flow values.

The product formed in multiplier Q3 is transmitted to an additional multiplier Mu1, that also maintains the combined number of processing events from the counter B1, which were handled by the central switching circuit ZW during the appertaining measuring time interval, and thus also information processing events as well as data processing events. A product is formed in the multiplier Mu1 that is transmitted to a comparator. This product indicates the combined number of processing events that the central switching unit could handle under respective existing operating conditions and thus information processing events and data processing events. This under the consideration that the central switching circuit is to be loaded for only to 95% of its time, as indicated above.

The number of processing events stored in the comparator is that number that is also stored in the counter W. When the indicated product is formed by the multiplier Mu1, at the end of a measuring time interval, it is transmitted to the comparator Vg1. here a comparison is made between the newly transmitted product on the one hand and the stored value on the other. If the product is greater than the stored value, the stored value is accordingly raised and a corresponding increase signal is sent to the occupation rate counter W via the path +b, where it signals an increase of the stored value of one or more units.

If, on the other hand, the product formed by the multiplier Mu1 is smaller than the corresponding value in the comparator Vg1, this is a criterion indicating that the combined number of processing events to be carried out by the central switching circuit CP, per measuring time interval, is smaller than previously. In this case, a corresponding signal is sent from the comparator Vg1 to the multiplier Mu2. This signal, thus says, that for the moment, more processing events are being sent to the central switching unit ZW than should be sent to it. The count value, formed by the counter B2 at the end of a measuring time interval, that indicates the number of information processing events that would be sent to the central switching unit CP during the corresponding measuring time interval, is sent to the multiplier Mu2. In addition, a product is sent from the multiplier Q4 to the multiplier Mu2, which is derived from the aforementioned quotient on the one hand, and that traffic flow value on the other, through which has been established, the part of the central switching unit to be used in handling its total number of information processing requests. The multiplier Mu2 forms a product from the values received and sends it to the comparator Vg2.

The comparators Vg1 and Vg2 contain stored comparison values. While the comparator Vg1 contains, as a comparison value, the combined number of processing requests to be processed per measuring time interval (information processing requests plus data processing requests), the comparator Vg2 contains the number of information processing requests to be processed per measuring time interval. Upon start-up, both of these values are theoretically arrived at and stored, or empirically derived average values. At all times, when the comparison value in the occupation rate counter W is either increased or decreased, the value in each of the two comparators Vg1 and Vg2 is also increased and/or decreased by the same amount.

The comparator Vg2 now makes a comparison of the received product and the stored value. If the product is greater than the stored value, this means that the number of information processing requests being sent to the central switching unit per measuring time interval can be greater. In this case the comparator Vg2 sends a corresponding increase signal to the occupation rate counter via the path +w. If instead the product is smaller than the value stored in the comparator Vg2 the comparator sends a corresponding decrease singal to the occupation rate counter W via the path −b. In those cases, in which the product sent to the one and the other of the two comparators is identical to the value stored in the appertaining comparator, the value stored in the occupation rate counter is not changed.

As set forth above, the increase signal or, respectively, the reduction signal is applied from the measuring device B to the occupation rate counter W. A comparison value (control standard) which is explained herein below is stored in the counter W. This comparison value is increased or, respectively, decreased upon receipt of the increase signal or, respectively, the reduction signal. These signals, i.e. the one or the other, respectively, are supplied from the measuring device B to the occupation rate counter W as mentioned above. All information processing requests which arrive via the line za, and are forwarded vfia the line ze, traverse the occupation rate counter. These information processing requests are a matter, in part, of initial request and, in part of successor requests. The switch identifiers emitted by a calling subscriber for setting up a connection are composed of an initial switch identifier (call signal) and of successor switch identifers which arrive at time intervals that are conditioned by the nature of the respective calling subscriber. One initial switch identifier and a plurality of successor switch identifiers therefore always belong together in conjunction with respective call setup. In addition, successor switch identifiers in conjunction with a respective call set up can be the end-of-selection identifier, the answer-identifier, the end-identifier ahd the like, i.e. line indicators, as well as call charge pulses. These switch identifiers are accepted with the aid of a decentralized switching circuit GP1; deriving therefrom are information processing requests which, in accordance with the discrimination of the switch identifiers into initial switch identifiers and processor switch identifiers, are likewise to be discriminated, mainly as initial requests and successor requests.

Information processing requests now successively arrive via the line za. A small portion of these are composed of initial requests and a larger portion are composed of successor requests. With respect to the various call set up operations, these information processing requests arrive unordered, i.e. mixed. They traverse the occupation rate counter W and are stored in a first in-first out (FiFo) memory. In a known manner, this FiFo memory comprises a greater plurality of memory units, whereby a respective memory unit serves for the storage of one information processing request. In response to call-in by the central switching unit CP/ZW, they are forwarded via a line h from the memory to the central switching circuit in the same sequence in which the information processing requests were forwarded to the memory via the line ze.

The occupation rate counter W then serves as a further measuring device for determining a deviation of the soon to be expected information processing work load of the central switching unit from its call-handling capacity. Of these, the occupation rate counter W, which is traversed by all information processing requests, counts only the initial request.

There are two possibilities for this latter counting. The one possibility is that a time mark is transmitted, for example every second, to the occupation rate counter via the line t2 that respectively starts or stops a counting event in the occupation rate counter W, and that a count result acquired between two respective time marks is compared to the comparison value. A further possibility is that a counter is incremented by the initial request and is de-incremented at uniform time intervals independently of the initial request, and that the comparison value affects a number of de-incrementation events which are respectively executed between two time marks in the same manner as set forth above.

A common FiFo memory is therefore provided for initial requests (initial switch identifiers). In order to limit the counting operation only to the initial requests, the occupation rate counter W selects the initial requests from the information processing requests (switch identifiers) supplied to the FiFo memory. As stated, the occupation rate counter W executes the counting in successive counting time intervals that are limited by the time marks. After the expiration of a counting time interval, the time marks respectively reset into its initial position and it supplies a count result which is to be compared to a comparison value at the end of each counting time interval. This comparison value (control standard) represents the threshold value. The other possibility is that the occupation rate counter W is incremented by the initial requests and is continuously de-incremented in steps. In this case, the occupation rate counter thus has a count result at any time that is subjected to a lasting comparison even which, however, is executed at least one incrementation even and/or per de-incrementation event on the basis of a threshold.

In both instances of the specific execution of the occupation rate counter W, as set forth above, the feed of initial requests (initial switch identifiers) to the FiFo memory is throttled as a consequence of exceeding the threshold, whereby an acceptance of all successor requests (Successor switch identifiers), even those respectively belonging to an initial request (Initial switch identifier), is prevented. A restriction device L is provided in order to accomplish this purpose. When the counting value in the occupation rate counter W, exceeds the threshold i.e. the comparison value, the occupation rate counter W, emits a reduction signal to the restriction device L by way of the line −v. When the exceeded threshold value has been eliminated by the counter, the occupation rate counter emits an increase signal +v to the restriction device L. The emission of an increase signal or a reduction signal from the occupation rate counter W to the restriction device L occurs at uniform time intervals of, for example, one second.

The restriction device L then serves the purpose of ensuring that a defined percentage of call set up attempts is rejected in the line trunk groups LTG1-LTGn. The quantity of incident information processing requests is to be reduced thereby. To this end, a memory Zi is provided in each of the decentralized switching units GP, this memory storing the percentage of call signals which is to be rejected upon recognition of information processing traffic overloads in order to defend against such overloads. Percentages of 0%, 25%, 33.3%, 50%, and 75% can be stored, for example, in this memory. These percentages indicate which portion of the incoming calls is to be subjected to non-acceptance. What is to be understood by non-acceptance is that, upon arrival of a call signal, an appropriate signal, for example a busy signal, or a signal asking the caller to wait, or an announcement, is sent to the appertaining subscriber, and that the acceptance or forwarding of selection indentifiers output by the subscriber is prevented. Instead of a percentage of call signals to be subjected to non-acceptance, it would be just as readily possible to provide a percentage to all call signals to be accepted, i.e. to store a "forward quota". The non-acceptance of call signals on the basis of a non-acceptance device, can occur in accordance with the countdown principle, whereby therefore, a calling subscriber can be randomly successful or unsuccessful with his call set up attempt, or a distinction can be made between the calls from subscribers and lines of various priority cases.

Data concerning the respective percentage of initial requests to be non-accepted or, respectively, forwarded are transmitted from the restriction device L to the decentralized switching unit GP and are continuously stored therein. Such a transmission of these data occurs either continuously, or only when an increase or decrease in this percentage is to be reported. The arrival of data reporting an increase or, respectively, decrease in the non-acceptable percentage, the stored percentage is reduced or, respectively, increased in steps in the memory switching device Zi provided in the decentralized switching units for the storage of percentage.

It is now provided, that these data, which serve the purpose of reporting the increase or the decrease of the percentage, are transmitted from the central switching unit to the decentralized switching unit and, in the latter, to the memory switching device Zi in common with the data, particularly the setting and control information for the execution of the switching procedures transmitted from the central switching unit to the decentralized switching units. To this end, the restriction device L is connected to the central switching unit CP/ZW via a line d. By way of this path it reports data regarding the valid percentage or, respectively, the percentage to be set. The central switching unit CP/ZW attaches these data, which are respective data having relatively little informational content, to the setting and control information serving for the execution of the switching procedures which, therefore, are continuously transmitted from the central switching ciruit to the decentralized switching units. It is therefore not necessary to have to start separate message transactions for the transmission of data concerning the respective percentage, rather these data accompany the setting and control information for the call set up. Since the data exchange with the various line trunk groups varies in intensity, the data reporting the respective percentage are therefore transported particularly rapidly to those decentralized switching unit which are involved in a particulary active data exchange with the central switching unit. In that the percentage mentioned is stored in the centralized switching unit, during the full operation of a load non-acceptance phase having an unchanging load non-acceptance, it is not necessary to transmit data regarding the same from the central switching unit to the decentralized switching units, this data relating to the information processing traffic overload. When information processing traffic overloads occur proceeding from one line trunk group, then the appertaining restriction data are communicated first to this line trunk group.

The information-processing requests (switch identifiers) therefore arrive in succession in their respective chronological sequence mixed with respect to various series (a series always corresponds to a call set up procedure). They indicate their respective series affiliation by way of a source address which accompanies every switch identifier. This source address indicates the respective allocation to the subscriber line circuit of a calling subscriber or to a connector set or to a line terminator or the like, i.e. to one of the mentioned call-associated switching facilities.

Provision is made so that after a successful parrying of an information traffic overload, given a decrease of a corresponding back-up of information processing requests, and after the reduction of the non-acceptance percentage output by the restriction device L to the switching unit CP/ZW (for the above described distribution to the decentralized switching circuits GP1) to the value zero, and after the lapse of a fixed minimum waiting time of, for example twelve seconds measured from the time of this reset, while the loadability values which determine the loadability are set to continuously high values, due to the reduction in the actual load, the adjustment of the comparison value stored in the storage S of the counter W is temporarily halted. This adjustment of the stored comparison value occurred on the basis of the measured loadability result acquired from the measuring device B and on the basis of the result of the division formed therefrom.

An indication device E is provided for measuring off the aforementioned minimum waiting time. The indication device E is connected to the output of the restriction device L via a line e. By way of the line e, the indication device E receives the non-acceptance percentage, respectively identified by the restriction device L. Further, the indication device E is connected to the time generator Zg via a line t1. When no information processing overload has been present over an uninterrupted, longer interval, for example 12 seconds, i.e. when the non-acceptance percentage has also uninterruptedly had the value zero for this time, then the loadability measurement is deactivated. Respectively beginning at the time of the resetting of the non-acceptance percentage in the restriction device L, the indication device E therefore monitors, whether this percentage remains at the value zero during the minimum waiting time, which is measured beginning at this time. When this condition is met, then the indication device E outputs an appropriate signal to the occupation rate counter W via a signal path w.

Likewise, at the beginning of the minimum waiting time, i.e. whenever the non-acceptance percentage specified by the restriction device L has reached the value zero, the indication device E transmits the signal to the occupation rate counter W via the signal path w, this signal identifying the beginning of a potential minimum waiting time. The effect of this signal in the occupation rate counter W is that the comparison value currently stored in the memory S is transferred to an auxiliary memory s and is stored therein. A comparison value which may potentially have already been stored therein earlier is thereby erased at the same time.

In accordance with the definition, of course, the non-acceptance percentage is uninterrruptedly equal to zero during the minimum waiting time. Non-acceptances were therefore not necessary during this time. As a rule, this is caused by a corresponding drop in load. During the minimum waiting time, this drop in load has then provided that the comparison value of the counter W stored in its memory S has been constantly adjusted with a positive tendency i.e. has gradually assumed a relatively high value. In practical terms this means, that given a renewed increase in the incoming flow of information processing requests or, respectively, of initial switch identifiers, a relatively high number of the same would be initially accepted, i.e. non-acceptances would not yet initially occur, in particular until finally, proceeding from the measuring device B, the regulation of the comparison value controlled by the loadability measurement would have again reduced this comparison value to such a level that on the basis of comparison value, again becoming correspondingly lower, the non-accpetance percentage again assumes definitive values, i.e. rises from increases from the value zero. This, however, would lead to a temporary overload of the central control unit. In order to avoid this effect, it is provided in the manner indicated, that a comparison value in the memory S of the counter W. given a drop of the non-acceptance percentage to the value zero, is transferred into the auxiliary memory s of the counter W so that it can be transferred back from the auxiliary memory s into the memory S at a later time, in particular after the conclusion of a load-adjustment phase, and an ideal phase of the non-acceptance event, and after a renewed initialization of the non-accpetance event.

After a deactivation of the comparison value regulation, the counter W works with an initialization comparison value that is higher than the stored comparison value in the memory S. This is the "special" threshold that has already been mentioned above. A renewed initialization of the comparison value adjustment, and of the information of the non-acceptance percentage data can be produced by two different causes. When the occupation rate counter W, which counts the initial switch indentifiers, again reaches a higher value, in particular a count value that is equal to or higher than the threshold, then the evaluation of the destination determinaton results supplied by the measuring device B is again started. This also occurs when the degree of filling of the FiFo memory, which stores both initial requests and successor requests, reaches or exceeds a defined limit value. The time interval between initialization and deactivation represents a load-regulating phase; during this phase, the current information processing workload is situated in a load-adjustment range which encompasses the full load and overload range.

It is thus provided that the initialization value stored in the memory S is defined at such a high level that the initialization only occurs when, given merely a brief duration overload, this quite substantially excedds the loadability. In this case, the initialization occurs over a very limited time. When, by contrast, the newly occurring overload only slightly exceeds the loadability limit, it takes longer for the initialization to begin. A limit value stored in the measuring device S of the FiFo memory is provided for this purpose. When the memory steadily fills, given the relatively slight but long lasting overload, the initialization occurs in that the degree of filling of this memory has reached or exceeded the limit value. The delay time is thereby approximately inversely proportional to the extent of the overload and is longer than the reaction time of the counter W to a suddenly occurring, high overload. The initialization value stored in the memory S and the limit value stored in the measuring device F of the FiFo memory therefore augment one another, in effect, in particular such that the initialization value stored in the memory S takes care of an optimally rapid recognition of a high overload and the limit value stored in the measuring device F takes care of the reliable recognition of even a slight overload. In addition to being caused by the supply of information processing requests from the decentralized switching circuits GP1-GPn (excess external offering), the load on the central control unit is also caused by internal executions, for example switching executions for the purpose of testing techniques and/or safety techniques (excess internal offering).

In idle phases of non-acceptance operations, therefore, both the initialization value and the limit value serve in the indicated manner to recognize an increase in the load of the central switching unit correctly, whereby the magnitude of a load discontinuity (recognizable slight overload by way of the initialization value) and/or a longer lasting, relatively slight overload (recognizable by way of the aforementioned limit value) can be determinant. Both values are stored in a manner set forth above in the memory S of the occupation rate counter W or, respectively, in the measuring device F of the FiFo memory. It is provided in accordance with the present invention that the value stored in the memory S, i.e. the threshold which determines the initialization of the transmission of the non-acceptance data, as well as the control standard serving the purpose of comparison, given an active overload, are continuously adjusted by way of a measured loadability result acquired in a time interval between the decrease of the non-acceptance rate to the value zero and renewed transgression of this threshold, i.e. in idle phases of the non-acceptance operations.

These loadability measurments in the idle phases of non-acceptance operations are likewise executed with the assistance of the measuring device, as well as with the aid of the occupation rate counter W. Measuring time intervals which are dimensioned adequately long for the compensation of short term fluctuations in this regard, in order to keep the remaining measuring error adequately small, are defined for these loadability measurements which therefore chronologically fall outside of the load regulating phases. The number of information processing requests, particularly only initial switch identifiers, incoming per measuring time interval is then identified within each measuring time interval. With the aid of the measuring device B, further, the current load of the central switching unit caused by the information processing requests is measured per time interval in the manner already set forth. The ratio of a traffic load maximally allowed during this measuring time interval to the actual traffic load resulting in this measuring time interval from the incoming information processing requests is thereby formed. On the basis of this ratio, formed per every measuring time interval by the measuring device B the indentified number of information processing requests, in particular only initial switch identifiers, incoming per measuring time interval, is then increased based on the measure of this ratio and is used for ongoing adjustment of the threshold and of the control standard in the memory S of the occupation rate counter. It can moreover be provided that the initial value for the control normal be increased by, for example, 10% or 20%, whereby the non-acceptance is accordingly delayed until a later time.

The description will now return to a presentation of the events within the load regulating phases. In such a phase, the measuring device B therefore applies a determination result relating to the loadability of the central control unit, this determination result acquiring the loadability which, for the reasons set forth above, always fluctuates somewhat and has its values integrated over time intervals which are respectively likewise sufficiently long in order to ensure that this determination result is adequately precise. This determination result is expressed in the measured loadability value which is constantly and newly stored in the memory B1 and is further expressed in the increase and reduction signals transmitted to the occupation rate counter W and in the comparison value which is thereby continuously regulated in the occupation rate counter W.

As has also been set forth above, at the end of a load regulating phase i.e. when the counter results periodically acquired from the occupation rate counter W becomes continuously smaller, i.e. from the counting-result to counting-result, a value thereby existing at the moment when the comparison value currently stored in the memory S is reached, or fallen below, this value therefore simultaneously corresponding to the comparison value and the most recent count value, is stored in the auxiliary memory s at the beginning of a minimum waiting time and is transferred therefrom into the memory S when this minimum waiting time has expired. This value remains stored in the memory s of the occupation rate counter after the conclusion phase initiated by an initialization. This value serves as an initial value for the identification of the starting threshold and of the control standard until, after the end of the first measuring time interval, a new initial value is present and the value stored in the memory S is overwritten by the latter. As a result of the ongoing adjustment of the aforementioned threshold, given an inactive overload defense, a distinct shortening of the minimum waiting time is also allowable, whereby a quasi-justified, longer maintaining of the overload carrying condition is substantially shortened.

What is claimed is:

1. Circuit arrangement for telecommunication switching systems, particularly telephone switching systems with at least one information processing switching device which is to maintain and process a series of technical switching information processing requests for selected individual call-ups as well as technical operating data processing requests for functional test procedures and/or for establishing and storing a data base serving the switching operation of a switching system, and with a measuring device, serving to measure the processing loadability of the switching device, which regulates a loadability through a reference-to actual comparison related to the respective sum of the actual occupied times per measuring period and a reference-occupied-total time resulting from the length of the measuring period and an established switching device reference traffic flow value, for example 95%, which indicates the momentary loadability of the switching device in terms of the number of information(s) to be processed by the switching device per measuring period and is accepted by a counter which accesses the inflow of the information to be processed to the switching system by counting the same through forward stepping, and in order to evaluate this inflow continuously in single steps is either caused to backward step through a clock pulse determined by the loadability value, or is respectively reset to zero by means of time intervals determined by the loadability value, and whose maximum attained count is an evaluation of this inflow, which upon reaching or exceeding a limit value, causes non-acceptance devices to non-accept a part of the information waiting to be processed, characterized in that the information processing requests, as opposed to the data processing requests, are accepted by the switching unit on a priority basis and accordingly the data processing requests are accepted only when fewer than a maximum number of information processing requests are presented to the same, that the reference-actual-comparison is initially based upon the resulting sum of the actual-occupied-times and the switching unit-reference-traffic flow rate corresponding to the total processing requests, that then, when this sum is smaller than the resulting reference-occupation-total duration, the number of information(s) to be processed by the switching unit is increased through the adjustment, but that then, when this sum is greater than the reference-occupation-total duration a modified reference-actual-comparison is accomplished, based only upon the sum of the actual-occupied-times resulting from the information processing requests and only the switching unit reference-traffic flow value corresponding to the information processing requests, and that the adjustment of the loadability value upon this modification of the reference-actual-comparison follows in such manner that then, when the indicated sum is smaller/greater than the resulting reference-occupation-total duration, the loadability value is increased/lowered.

2. Circuit arrangement according to claim 1, wherein after measurement of the threshold value, upon renewed crossing of the threshold value, a valid adjustment standard is applied based on the formation of the non-acceptance data.

* * * * *